United States Patent
Sersch

(10) Patent No.: US 9,540,846 B2
(45) Date of Patent: Jan. 10, 2017

(54) FLAT MOTOR VEHICLE KEY

(71) Applicant: Jurgen Sersch, Solingen (DE)

(72) Inventor: Jurgen Sersch, Solingen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 407 days.

(21) Appl. No.: 13/941,720

(22) Filed: Jul. 15, 2013

(65) Prior Publication Data

US 2014/0021025 A1    Jan. 23, 2014

(30) Foreign Application Priority Data

Jul. 20, 2012  (DE) .................. 10 2012 106 622

(51) Int. Cl.

| | | |
|---|---|---|
| *E05B 19/04* | (2006.01) | |
| *E05B 19/00* | (2006.01) | |
| *G07C 9/00* | (2006.01) | |
| *H01M 2/10* | (2006.01) | |
| *H01H 9/28* | (2006.01) | |

(52) U.S. Cl.
CPC .......... *E05B 19/0082* (2013.01); *E05B 19/04* (2013.01); *G07C 9/00944* (2013.01); *H01H 9/285* (2013.01); *H01M 2/1044* (2013.01)

(58) Field of Classification Search
CPC ............. Y10T 70/7791; Y10T 70/7876; Y10T 70/7802; E05B 19/00; E05B 19/0082; E05B 19/04; G07C 9/00944
USPC .......................................... 70/393, 395, 408
See application file for complete search history.

(56) References Cited

U.S. PATENT DOCUMENTS

| | | | | |
|---|---|---|---|---|
| 4,276,582 A | * | 6/1981 | Burnett ................ | E05B 17/103 362/116 |
| 4,521,833 A | * | 6/1985 | Wolter ................. | E05B 17/103 362/100 |
| 5,157,244 A | * | 10/1992 | Mroczkowski .... | G07C 9/00944 235/441 |
| 5,652,587 A | * | 7/1997 | Liu .................... | G07C 9/00944 341/176 |
| 6,601,421 B1 | * | 8/2003 | Chaillie ................... | F16B 2/22 70/278.1 |

(Continued)

FOREIGN PATENT DOCUMENTS

| | | |
|---|---|---|
| DE | 10 2006 018 900 | 11/2006 |
| DE | 10 2006 019 690 | 11/2006 |
| WO | WO 96/10899 | 4/1996 |

OTHER PUBLICATIONS

European Search Report completed Oct. 14, 2013 for Application No. EP 13 17 1640.

*Primary Examiner* — Christopher Boswell
(74) *Attorney, Agent, or Firm* — Fay Sharpe LLP

(57) ABSTRACT

A motor vehicle key of flat structure includes a circuit board with an opening, a mounting for a battery, wherein the mounting extends at least partially over the opening, and contact elements, which are electrically coupled to the circuit board. One contact element includes a resilient contact section, by means of which the battery may be fixed in the position in the mounting. The contact element is fastened to the circuit board such that a region of the resilient contact section extends over the opening above a plane defined by the surface of the circuit board and at least this region is received in the opening when the battery is disposed in the mounting and is fixed in position in it by the resilient contact section.

15 Claims, 3 Drawing Sheets

(56) References Cited

U.S. PATENT DOCUMENTS

| | | | | |
|---|---|---|---|---|
| 6,852,929 B2* | 2/2005 | Scudder | ............ | G07C 9/00944 |
| | | | | 174/66 |
| 7,463,134 B1* | 12/2008 | Stilley | ................... | A45C 11/18 |
| | | | | 340/5.61 |
| 8,021,776 B2* | 9/2011 | Habecke | ................. | E05B 19/04 |
| | | | | 340/426.13 |
| 8,920,963 B2* | 12/2014 | Hirano | ............... | G07C 9/00944 |
| | | | | 429/174 |
| 2006/0245145 A1 | 11/2006 | Wada et al. | | |
| 2006/0245170 A1 | 11/2006 | Sugimoto et al. | | |
| 2009/0017778 A1 | 1/2009 | Akieda | | |
| 2012/0087096 A1* | 4/2012 | Shen | .................. | G07C 9/00944 |
| | | | | 361/760 |
| 2013/0039024 A1 | 2/2013 | Sugimoto et al. | | |
| 2013/0044446 A1* | 2/2013 | Montarou | ............. | E05B 19/043 |
| | | | | 361/752 |
| 2014/0190737 A1* | 7/2014 | Chen | .................. | G07C 9/00944 |
| | | | | 174/535 |
| 2014/0363716 A1* | 12/2014 | Nishida | ................ | B60R 25/406 |
| | | | | 429/100 |

* cited by examiner

FLAT MOTOR VEHICLE KEY

BACKGROUND

The present invention relates to a motor vehicle key and particularly a motor vehicle key of flat type. Modern motor vehicle keys commonly include a circuit board, on which at least one electronic assembly, which generally includes a transmitting and receiving unit, is mounted, by means of which a motor vehicle can be unlocked and locked. In addition to this basic functionality of the electronic assembly, further functions have increasingly been associated with it in the recent past so that it is necessary to appropriately adapt the power supply to the electronic assembly. For the purpose of supplying power to the electronic assembly, a replaceable battery is commonly arranged in the key and coupled via contact elements to the circuit board and thus to the electronic assembly. The increasing power requirement of the electronic assembly necessitates larger batteries and associated with this is an increase in the structural height of the battery. The batteries are generally mounted on a spring element, which urges the battery against an abutment within the motor vehicle key. A minimum height of the motor vehicle key is predetermined by the spring/battery/abutment combination. An excessive structural height of the motor vehicle key reduces the convenience of using it and the possibilities for storing the motor vehicle key.

It is therefore the object of the present invention to provide a motor vehicle key with a small structural height and an increased convenience of use.

BRIEF SUMMARY

This object is solved in accordance with the invention by a motor vehicle key with a circuit board, which includes an opening. This opening can be a recess in the circuit board but the opening can also pass completely through the circuit board, whereby the circuit board is completely removed in the vicinity of the opening. The opening can be disposed at any desired position on the circuit board and it can thus be a through opening or a cut-out in the end side or the longitudinal side or at one of the corners.

The motor vehicle key in accordance with the invention further includes a mounting for a battery, wherein the mounting extends at least partially over the opening. This mounting can, for instance, be the housing itself but the mounting can also be a separate component, which is fastened, for instance, to the circuit board or the housing, whereby in such a case the mounting can also be constructed integrally with the aforementioned components of the motor vehicle key. In general, the mounting can be provided by any desired portion of the motor vehicle key provided that it is ensured that the mounting extends at least partially over the opening. The motor vehicle key further includes contact elements, which are electrically coupled to the circuit board, whereby at least one contact element includes a resilient contact section, by means of which a battery may be fixed in the mounting. The contact element with the resilient contact section is fastened to the circuit board such that at least one region of the resilient contact section extends over the opening above a plane defined by the surface of the circuit board. The remaining region of the resilient contact section can be arranged in the opening, when no battery is inserted, or above it, depending on the construction of the contact element or the resilient contact section of the contact element. When a battery is arranged in the mounting, the region, which extends above the plane, of the resilient contact section is received in the opening and the resilient contact section fixes the battery in the mounting by means of this region. The construction of the further contact element is dependent on the precise design of the motor vehicle key and, the further contact element can, for instance, be arranged in the mounting.

When a battery is inserted, the resilient contact section of the contact element is completely received in the opening so that the battery, depending on the precise design of the motor vehicle key, rests, for instance, directly on the circuit board and positional fixing and electrical contact are nevertheless ensured by the spring force of the resilient contact section. The structural height of the motor vehicle key is thus reduced without the electrical contact or mounting of the battery in the motor vehicle key being disadvantageously influenced.

The precise construction of the resilient contact section is dependent on the particular field of application, the battery to be used and the fastening to the circuit board. It is, however, preferred that in the contact region between the resilient contact section and the battery the resilient contact section is of spherical shape. The spring force of the resilient contact section thus acts only at a point, which ensures optimal contact with the battery and also spares the surface of the battery, over which the spherical section moves when the battery is inserted or slid into the mounting, from damage.

In a preferred embodiment of the motor vehicle key in accordance with the invention, the resilient contact section of the contact element includes a plurality of spring arms, wherein the contact region of each spring arm can be of spherical shape. In dependence on the design of the battery and of the opening in the circuit board, the position of the battery in the mounting is secured against tilting with a resilient contact section constructed in this manner.

The fastening of the contact element with the resilient contact section to the circuit board may be of any type as regards the fastening per se. Thus, for instance, a fastening region of the contact element can be hard soldered to the circuit board, whereby of course care should always be taken that a region of the resilient contact section extends above the plane defined by the surface of the circuit board.

Depending on the precise design of the motor vehicle key, it can be advantageous if the circuit board has a recess, in which the contact element is fastened by means of its fastening section, whereby this recess is constructed such that the fastening region of the contact element does not pass through the plane defined by the surface of the circuit board. As a result of this feature, even flat components can be fastened directly to the circuit board in the fastening region and extend over the fastening region.

As already indicated, the battery can rest directly on the circuit board in special embodiments of the motor vehicle key. In a preferred embodiment of the battery key in accordance with the invention, it is therefore provided that the circuit board includes a protective coating in the region around the opening, which protects the circuit board against damage by the battery, both when it is inserted and during the slight day-to-day movements in the mounting.

BRIEF DESCRIPTION OF THE DRAWINGS

The invention will be explained below with reference to a number of preferred embodiments, which are illustrated in the accompanying drawings, in which.

DETAILED DESCRIPTION

Figure 1A:
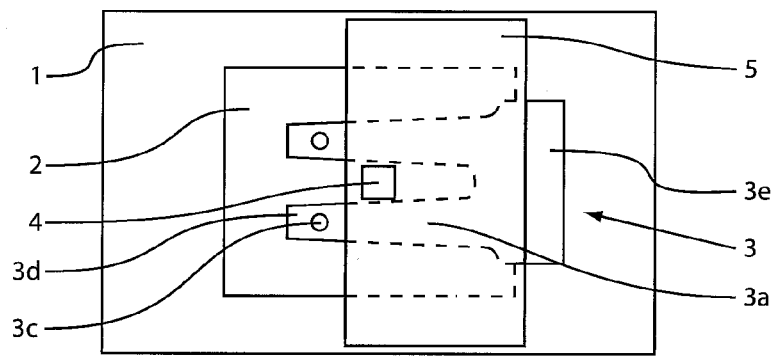
FIGS. 1A-1D show a first embodiment of the motor vehicle key in accordance with the invention
Figure 1B:
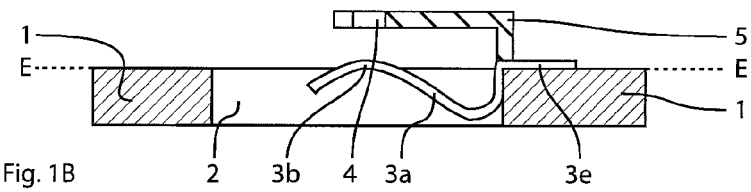
Figure 1C:
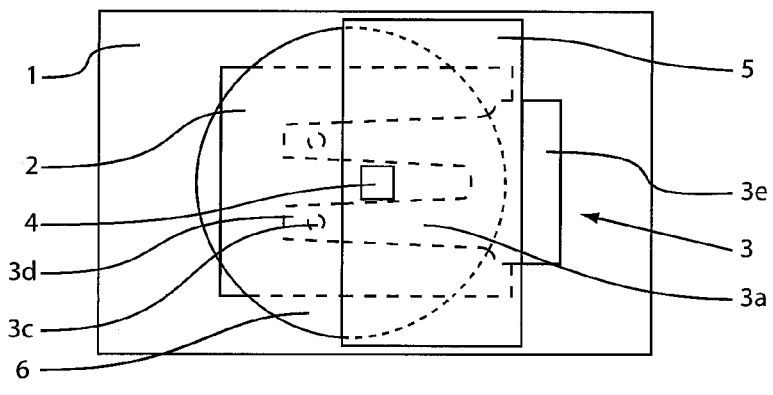
Figure 1D:
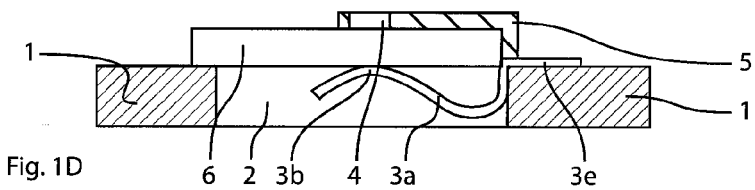

A plan view (FIGS. 1A and 1C) and a sectional view (FIGS. 1B and 1D) of a first embodiment of the motor vehicle key in accordance with the invention are shown in FIGS. 1A-1D, wherein in FIGS. 1C and 1D a battery 6 is inserted into the mounting 5 provided for it.

In the subsequent description of the figures, it is generally the case that only the components of the motor vehicle key which are of importance for the invention are illustrated (for instance the housing is always omitted; in the illustrated embodiments the mounting is not provided by the housing but by a special component). The embodiment shown in FIGS. 1A-1D includes a circuit board 1 with an opening 2, which is arranged centrally in the circuit board 1 and passes completely though it, as can be seen in FIGS. 1B and 1D. Arranged on the circuit board 1 is a mounting 5, which extends over at least a section of the opening 2. In the exemplary embodiment which is illustrated here, the mounting 5 for a battery is fastened to the circuit board. In other exemplary embodiments, as already indicated, the mounting can be provided by, for instance the housing or a component fastened to the housing.

Fastened to the circuit board 1 is a first contact element 3 with a resilient contact section 3a, wherein the resilient contact section 3a includes two spring arms 3d, at whose end region a spherical formation 3c is formed. As may be seen FIG. 1B, the resilient contact section 3a includes a region 3b, which extends above a plane E defined by the surface of the circuit board 1. In the contact element 3 in accordance with the first embodiment, it may be seen in the sectional view 1B that the resilient contact section 3a of the contact element 3 is of wave-like shape and to a large extent is disposed in the opening 2, when no battery 6 is inserted. The resilient contact section 3a merges into the fastening section 3e, by which the contact element 3 is fastened to the circuit board 1. In the illustrated embodiment, a further contact element 4 is arranged in the mounting 5; the arrangement of the contact element 4 within the motor vehicle key is not of importance for the present invention and it is merely to be ensured that when the battery is slid into position a reliable contact also occurs via the second contact element 4.

FIGS. 1C and 1D show the same embodiment with the battery 6 inserted or slid into position. As a result of the construction of the mounting, the battery is slid into the mounting "from the left". Caused by the fact that a region 3b of the resilient contact section 3a extends above the plane E, the resilient contact section 3a is pressed by the region 3b on insertion of the battery further into the opening 2 so that when the battery 6 has been slid in the resilient contact section 3a is wholly accommodated by the opening 2 and is at the same time the battery 6 is fixed in position in the mounting 5 by the spring force of the resilient contact section 3a. As a result of the construction of the motor vehicle key in accordance with the invention, the resilient contact section 3a, which is of importance for the fixing in position of the battery 6 in the mounting 5, of the contact element 3 is completely received in the opening 2 so that the contact element does not have a disadvantageous influence on the structural height of the motor vehicle key but at the same time a reliable fixing in position of the battery 6 is ensured.

Figure 2A:
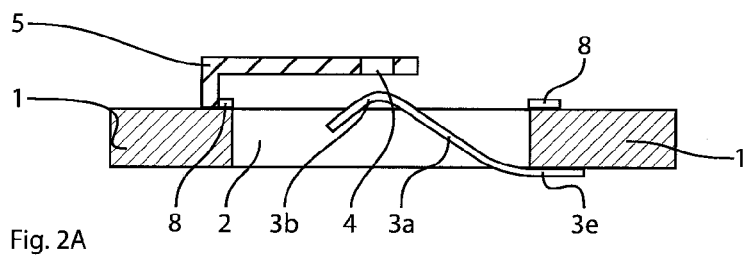
FIGS. 2A and 2B show a further embodiment of the motor vehicle key in accordance with the invention
Figure 2B:
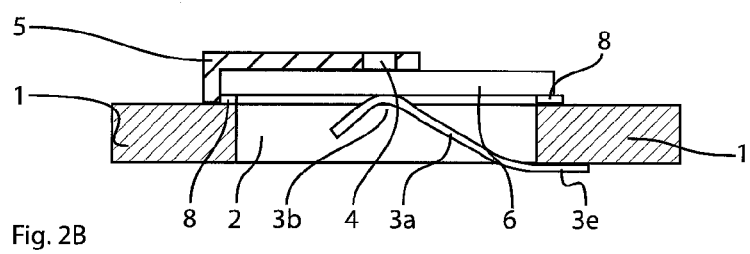

FIGS. 2A and 2B show a further embodiment of the motor vehicle key in accordance with the invention, whereby in this embodiment the contact element 3 is of different construction. The contact element 3 used in this embodiment is fastened by means of its fasting region 3e to the underside of the circuit board 1 and the resilient contact section 3a extends through the opening 2 and a region 3b of the resilient contact section extends above the plane defined by the surface of the circuit board 1. In the illustrated exemplary embodiment, the mounting 5 is different insofar as it is arranged "on the other side" of the opening 2. This changes nothing as regards the mode of operation; on insertion, (which again is determined by the design of the mounting) the resilient contact section 3a is pressed by the region 3b further into the opening 2 and, when a battery is inserted, is completely accommodated by it. Arranged around the opening 2 is a protective coating 8. The battery is arranged in direct contact with circuit board 1 and the coating 8 protects the board against damages from the battery 6 (when, for example, the battery is inserted).

In dependence on the "sliding in direction" or installation direction of the battery, it is preferred that the resilient contact section is of round shape in the region 3b so that insertion is possible from both sides.

Figure 2C:
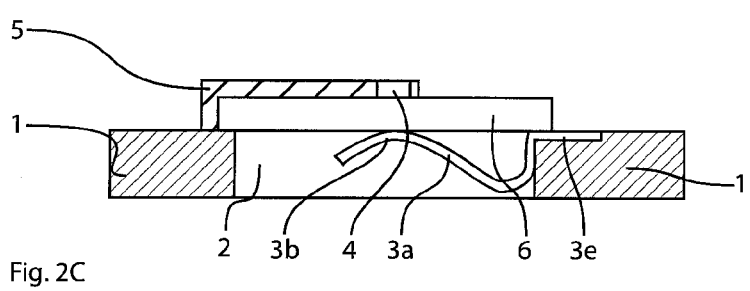
FIGS. 2C, 2D and 3 show respective further embodiments of the motor vehicle key in accordance with the invention.

FIG. 2C shows a further embodiment, which, apart from the positioning of the mounting 5, differs from the embodiment illustrated in FIGS. 1A-1D in that the circuit board 1 has a recess 7, in which the fastening region 3e of the contact element 3 is disposed, whereby the recess 7 is dimensioned such that the fastening region 3e of the contact element 3 does pass above the plane E defined by the surface of the circuit board 1 so that it is ensured that in this region even flat components can be installed on the circuit board.

Figure 2D:
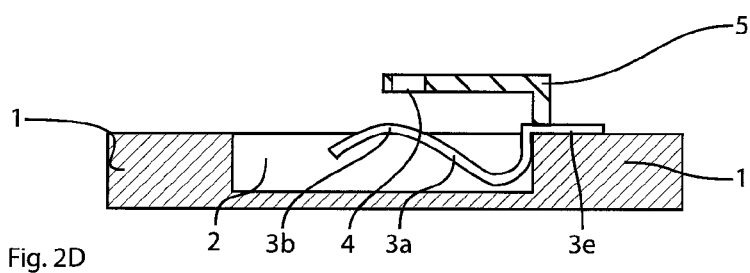

In the embodiment illustrated in FIG. 2D, the opening does not pass through the circuit board completely but constitutes a sort of well in the circuit board 1. Such a construction of the opening 2 has, however, no further effect on the motor vehicle key in accordance with the invention or its function; when a battery is slid in, the resilient contact section 3a of the contact element 3 is pressed by the region 3b into the opening and is completely accommodated by it when a battery 6 has been inserted.

Figure 3:
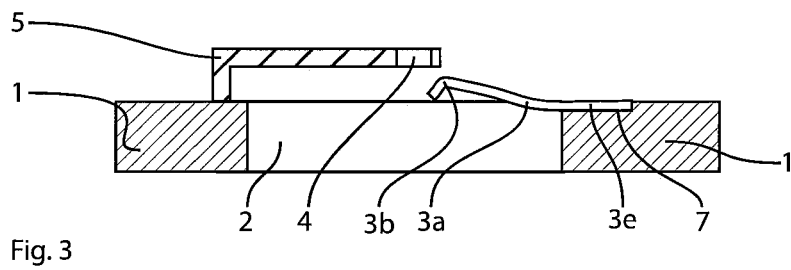

FIG. 3 shows an embodiment, in which the contact element 3 is of different construction in comparison to the previous embodiments. The contact element 3 is again fastened by means of the fastening region 3e in a recess 7 in the circuit board. The resilient contact section 3a of the contact element 3 does not, however, extend, or only to a small extent (when a battery is not inserted) into the opening 2 but instead extends substantially above the plane defined by the surface of the circuit board 1. When a battery 6 is inserted in this embodiment the resilient contact section 3a is forced into the opening 2 and is completely received by it when a battery 6 has been inserted.

Figures 4A, 4B:
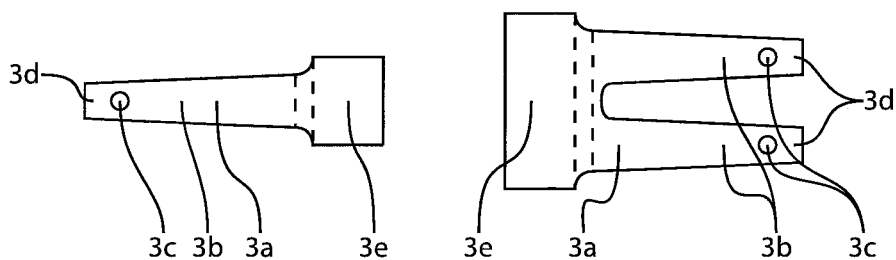
FIGS. 4A and 4B show two embodiments of the contact element with a resilient contact section.

FIGS. 4a and 4b show different embodiments of the contact element 3 with a resilient contact section 3a used in the motor vehicle key in accordance with the invention. In the embodiment shown in FIG. 4a, the resilient contact section 3a of the contact element 3 includes a spring arm 3d, arranged on whose end there is a spherical convexity 3c. In the embodiment shown in FIG. 4B (which was already shown in the embodiments of FIGS. 1A-1D, 2A and 2B, 2C and D), the resilient contact section 3a includes two spring arms 3d with respective spherical convexities 3c at the end region of the spring arms 3d.

Figures 5A, 5B:
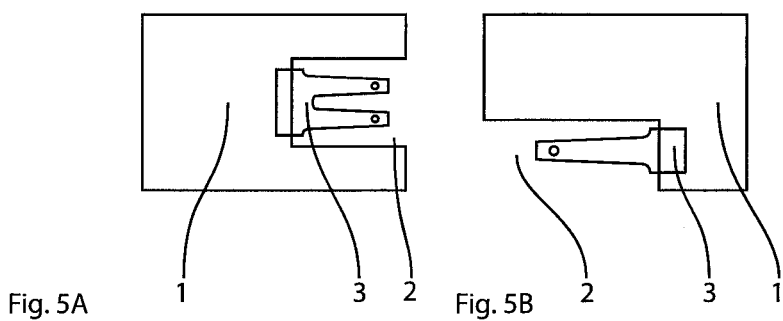
FIGS. 5A and 5B show different types of the opening and of the fastening resulting therefrom of an exemplary contact element.

FIGS. 5A and 5B show different configurations or arrangements of the opening 2 in or at the circuit board 1. In the embodiment illustrated in FIG. 5A, the opening 2 is constructed in the form of a cut out in an end surface of the circuit board, which results in a U-shaped structure of the circuit board. In the embodiment illustrated in figure SB, the lower left hand corner region of the circuit board is cut away.

The invention described above is not limited to the embodiments which are described in detail and illustrated. It will be apparent that numerous changes obvious to the expert and appropriate to the intended use may be effected to the embodiments illustrated in the drawings without departing from the scope of the invention. Thus, in particular, numerous variations are possible in the construction of the contact element with a resilient contact region and in the arrangement and fastening to the circuit board.

The invention claimed is:

1. A motor vehicle key including
a circuit board with an opening,
a battery mounting, wherein the battery mounting extends at least partially over the opening,
a battery,
contact elements, which are electrically coupled to the circuit board, wherein one contact element includes a resilient contact section, by means of which the battery may be fixed in the battery mounting,
wherein the contact element with the resilient contact section is fastened to the circuit board such that a region of the resilient contact section above a plane defined by a surface of the circuit board extends over the opening and at least this region is received in the opening, when the battery is arranged in the battery mounting and is fixed in it by the resilient contact section, and
wherein the battery is mounted in the battery mounting and does not extend into the circuit board opening.

2. A motor vehicle key as claimed in claim 1, characterised in that the resilient contact section includes a plurality of spring arms.

3. A motor vehicle key as claimed in claim 1, characterised in that the resilient contact section is spherical in a contact region.

4. A motor vehicle key as claimed in claim 1, characterised in that the circuit board includes a recess, in which the one contact element is fastened, wherein the recess is constructed so that a fastening region of the one contact element does not extend beyond the plane defined by the surface of the circuit board.

5. A motor vehicle key as claimed in claim 1, characterised in that the circuit board includes a protective coating in the region around the opening.

6. A motor vehicle key including
a circuit board including an opening,
a battery mounting attached to the circuit board, wherein the battery mounting extends at least partially over the opening,
a battery,
a contact element which is electrically coupled to the circuit board, wherein the contact element includes a resilient contact section, adapted to fix the battery in the battery mounting,
wherein the contact element is fastened to the circuit board such that a region of the resilient contact section located above a plane defined by a surface of the circuit board extends over the opening and at least this region is received in the opening when the battery is arranged in the battery mounting, and the battery is fixed in the battery mounting by the resilient contact section, and
wherein the battery has a size which is larger than a size of the circuit board opening.

7. The motor vehicle key of claim 6, wherein the resilient contact section includes a plurality of spring arms.

8. The motor vehicle key of claim 6, wherein the resilient contact section is spherical in a contact region.

9. The motor vehicle key of claim 6, wherein the circuit board includes a recess, in which the contact element is fastened, wherein the recess is constructed so that a fastening region of the contact element does not extend beyond the plane defined by the surface of the circuit board.

10. The motor vehicle key of claim 6, wherein the circuit board includes a protective coating in the region around the opening.

11. A motor vehicle key comprising
a circuit board including an opening and a surface,
a battery mounting connected to the circuit board, wherein the battery mounting extends at least partially over the opening,
a battery,
a contact element which is electrically coupled to the circuit board, wherein the contact element includes a resilient contact section adapted for securing the battery in the battery mounting,
wherein the resilient contact section of the contact element includes a region that is located above a plane defined by the surface of the circuit board, which region extends over the opening and is received in the opening when the battery is held in the battery mounting, and
wherein the battery, when it is held in the battery mounting, is spaced from the circuit board opening such that only the region of the resilient contact section of the contact element is located in the circuit board opening.

12. The motor vehicle key of claim 11, wherein the resilient contact section includes a plurality of spring arms.

13. The motor vehicle key of claim 11, wherein the resilient contact section is spherical in a contact region.

14. The motor vehicle key of claim 11, wherein the circuit board includes a recess, in which the contact element is fastened, wherein the recess is constructed so that a fastening region of the contact element does not extend beyond the plane defined by the surface of the circuit board.

15. The motor vehicle key of claim 11, wherein the circuit board includes a protective coating in the region around the opening.

* * * * *